Patented June 19, 1951

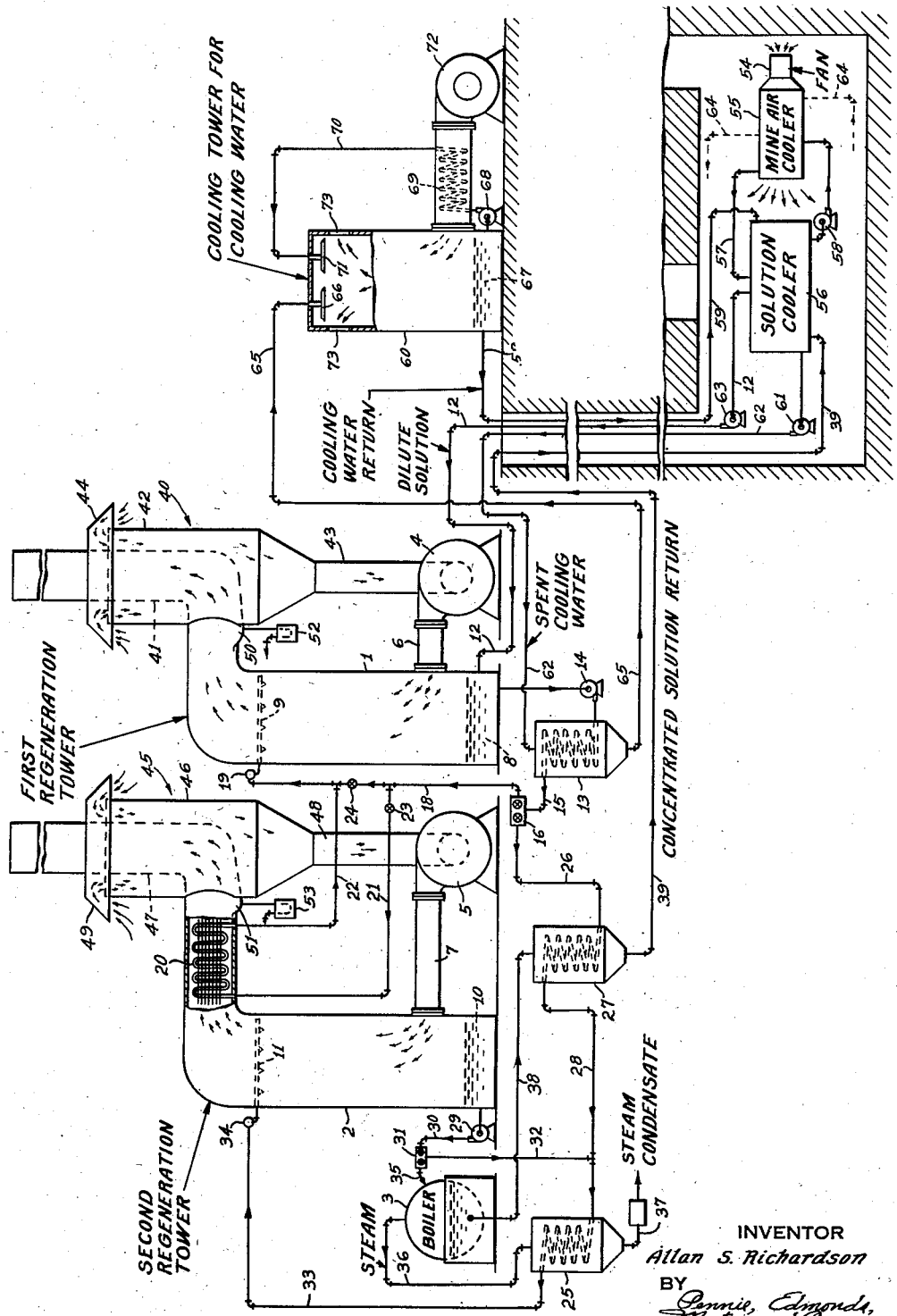

2,557,204

UNITED STATES PATENT OFFICE 2,557,204

CONCENTRATING HYGROSCOPIC SOLUTION

Allan S. Richardson, Butte, Mont.

Application June 17, 1947, Serial No. 755,179

16 Claims. (Cl. 183—120)

This invention relates to concentrating diluted hygroscopic solutions, and is particularly concerned with the provision of an improved method and improved apparatus suitable for regenerating, by concentrating, a hygroscopic solution used as a moisture absorbing agent. For example, the new method and the new apparatus are eminently suited for use in conjunction with an air-cooling or air-conditioning system, wherein a hygroscopic solution is used to reduce the moisture content of humid air. One such process in conjunction with which the method and apparatus of the present invention may be used with advantage is described in my copending application Serial No. 527,125, filed March 18, 1944, now Patent No. 2,479,408 granted August 16, 1949, of which this application is a continuation-in-part.

My said copending application describes an air-cooling system in which humid air is brought in contact with a hygroscopic solution, such as an aqueous solution of zinc chloride, calcium chloride, lithium chloride, or diethylene glycol. Moisture is absorbed from the humid air by the hygroscopic solution during the course of such contact, lowering the wet bulb temperature of the air and concurrently resulting in dilution of the hygroscopic solution. Ultimately the hygroscopic solution must be concentrated, by removing the excess water with which it has become diluted, in order for it to continue to be used successfuly in the air-cooling or air-conditioning system.

Various methods are available for effectively concentrating hygroscopic solution. For example, the solution may be concentrated by refrigeration at a low enough temperature to freeze the excess water, which may be removed mechanically as ice from the residual concentrated solution. Alternatively, the solution may be heated to a high temperature (approaching its boiling point) for a long enough period to vaporize the excess water, after which the concentrated solution may be cooled again to the temperature at which it is used in the air-cooling system. Concentrating procedures of this sort, while effective, are not particularly economical, because a large amount of power is required if refrigeration is used, or a considerable quantity of fuel and cooling water is required to boil off the excess water, if conventional heating methods are used.

The present invention provides for concentrating diluted hygroscopic solutions in a particularly economic and efficient manner that reduces to a minimum the amount of power and fuel required. The invention is singularly adapted for use in concentrating efficiently and economically a hygroscopic solution used for cooling the warm humid air encountered in underground mines.

The invention takes advantage of the fact that during the winter months in most parts of the United States and in many foreign countries, the amount of water vapor carried in the air is very low (even though the relative humidity be quite high) at low winter temperatures, and consequently the vapor pressure of the air is low. Also during the summer months, in the more arid areas of the country, such as Montana, Arizona, etc., the vapor pressure of the air is low. Thus during a large part of the year in most regions, and during all of the year in some regions, a considerable part of the excess water carried by a hygroscopic solution that has been diluted with moisture absorbed from warm humid mine air may be evaporated quite rapidly into the outdoor atmosphere, provided only that the latent heat of evaporation of the excess moisture be, for the most part, supplied from an external source.

Based on these circumstances, the present invention provides for concentrating diluted hygroscopic solutions by evaporation of excess moisture into the outdoor atmosphere. The concentrating system of the invention is to a considerable extent operated at a temperature well below the boiling point of water, so that a considerable part of the heat required from external sources for evaporating the excess moisture may be supplied by low-temperature sources of waste heat, such as heated spent cooling water that must be cooled for reuse; and it provides for extensive heat-interchange between various parts of the concentrating system so as to effect maximum utilization of the heat supplied from external sources. Consequently the amount of heat that must be supplied by a burning fuel or the like is reduced to a bare minimum.

The method of the invention comprises repeatedly circulating diluted hygroscopic solution in a first regenerating circuit in heat-exchange relation with a heating medium and thence in contact with a current of air having a vapor pressure less than that of the solution with which it is in contact. The heating medium used at this stage may comprise a heated spent coolant that has become heated by previous use in cooling the hygroscopic solution in an air-cooling system such as that described in my aforementioned copending application Serial No. 527,125, now Patent No. 2,479,408, or in my copending application Serial No. 651,991, filed March 5, 1946, now Patent No. 2,525,045, granted October 10, 1950. Partially concentrated hygroscopic solution is withdrawn from the first regenerating circuit and is repeatedly circulated in a second regenerating circuit in heat-exchange relation with a second heating medium (having a somewhat higher temperature than the heating medium used in the first regenerating circuit) and thence in contact with a second current of air having a vapor pressure less than that of the solution with which it is in contact. Further concentrated solution is withdrawn from the second regenerating circuit, and is heated in a boiler to a temperature approximating the boiling temperature of water. Since the hygroscopic solution has been appreciably concentrated in the first two regenerating circuits, only a minimum of heat is required to effect final concentration in the boiler.

Steam evaporated from the solution in the boiler may be used as the heating medium with which the solution passes in heat-exchange relation in the second regenerating circuit. The hot concentrated solution withdrawn from the boiler advantageously is passed in heat-exchange relation with partially concentrated solution passing from the first to the second of the two regenerating circuits.

As the hygroscopic solution is generally at a higher temperature than the air with which it passes in contact in each of the regenerating circuits, it is advantageous to preheat the air entering each regenerating circuit by passing it in heat-exchange relation with warm air leaving the circuit.

Since the second regenerating circuit operates in a somewhat higher temperature range than the first regenerating circuit, it is often desirable to supplement the heating medium used in the first regenerating circuit, by passing solution circulating in such circuit in heat-exchange relation with warm air leaving the second regenerating circuit.

The apparatus of the invention comprises first and second regeneration towers each having a sump at its base and a spray head near its top. A fan, blower or the like is provided for inducing an upward current of air through each tower, and first and second heat-exchangers are associated with the first and second regeneration towers, respectively. A conduit connected to the first heat-exchanger provides for supplying a heating medium thereto from a convenient source. A boiler equipped for heating hygroscopic solution therein also is provided.

A first circulation system provides for circulating solution from the sump of the first tower through the first heat-exchanger to the spray head of said tower and downwardly as a spray through the upward current of air therein, back to the sump. A similar circulation system provides for circulating hygroscopic solution through the second regeneration tower and its associated second heat-exchanger. A conduit connects the first and second circulation systems, so that partially concentrated hygroscopic solution may be delivered from the first circulation system to the second. Another conduit connects the second circulation system with the boiler, for the purpose of delivering further concentrated solution from the second circulation system to the boiler. The steam off-take from the boiler is connected to the second heat-exchanger, so that steam passing from the boiler enters the second heat-exchanger, where it comes in heat-exchange relation with the solution being circulated in the second circulation system.

A third main heat-exchanger included in the conduit through which partially concentrated solution is passed from the first circulation system to the second may be connected to the boiler so that hot concentrated solution from the boiler is passed in heat-exchange relation with partially concentrated solution being delivered to the second circulation system.

The air-discharge end of either or both of the regeneration towers advantageously comprises a heat-exchanger connected by a conduit to the blower, so that air delivered by the blower to the tower is first passed in heat-exchange relation with air leaving the tower.

Advantageously the second regeneration tower is provided with another heat-exchanger located in the path of air leaving such tower and connected in the first circulation system, so that solution circulating in the first circulation system may be heated by air leaving the second regeneration tower.

The foregoing and other features of the invention are described below with reference to the accompanying drawing, the single figure of which shows more or less schematically the apparatus of the invention as it is assembled for carrying out the method of the invention.

The apparatus shown in the drawings comprises first and second regeneration towers 1 and 2 and a fuel-fired or otherwise heated boiler 3. Blowers 4 and 5 are connected at their discharge ends by conduits 6 and 7 to the first and second regeneration towers, respectively. The first regeneration tower has a sump 8 at its base below the point of connection of the blower conduit 6, and a spray head 9 in its upper portion. The second regeneration tower similarly is provided with a sump 10 at its base, below the point at which the blower conduit 7 is connected, and a spray head 11 in its upper portion. Diluted hygroscopic solution to be concentrated is delivered to the sump 8 at the base of the first regeneration tower through a conduit 12.

A first heat-exchanger 13 is associated with the first regeneration tower, and a circulation system is provided for repeatedly circulating hygroscopic solution through this heat-exchanger and the first regeneration tower. The circulation system comprises a pump 14, the intake side of which is connected to the sump 8 at the base of the first regeneration tower, and the discharge side of which is connected to one end of a heating coil within the first heat-exchanger 13. The other end of the heating coil is connected by a conduit 15 to a proportioning valve 16, from which another conduit 18 leads to a header 19 through which solution is delivered to the sprays of the spray head 9.

By means of the above-described circulation system, hygroscopic solution may be withdrawn continuously from the sump at the base of the first regeneration tower and forced by the pump 14 through the heat-exchanger 13 and the conduits 15 and 18 to the spray head 9. There the solution is sprayed downwardly through the rising current of air delivered to the first regeneration tower by the blower 4. The sprayed solution falls to the sump 8, whence it may again pass through the circulation system to the spray head 9.

A heat-exchanger 20 is located in the path of air leaving the second regeneration tower, and this heat-exchanger is connected by conduits 21 and 22 to the conduit 18 forming a part of the circulation system associated with the first regeneration tower. Valves 23 and 24 are located in the conduits 21 and 18, so that any desired fraction of the solution passing through the conduit 18 may be diverted through the conduit 21 to the heat-exchanger 20 and therefrom back through the conduit 22 to the conduit 18, before passing to the header 19 and spray head 9. By this means, heating of the solution passing through the first circulation system, which is primarily effected by the first heat-exchanger 13, may be augmented by the heat-exchanger 20 in the current of warm air leaving the second regeneration tower.

The proportioning valve 16 serves for diverting a portion of the solution passing through the first circulation system associated with the first regeneration tower to a second main heat-exchanger 25 connected in a second circulation system associated with the second regeneration tower. To this end, a conduit 26 connects the proportioning valve 16 to the heating coil of a third heat-exchanger 27, and the outlet of this heating coil is connected by a conduit 28 to the heating coil of the second heat-exchanger 25. The circulation system in which the second heat-exchanger 25 is connected comprises a pump 29, the intake of which is connected to the sump 10 of the second regeneration tower, and the outlet of which is connected by a conduit 30 to a second proportioning valve 31. A conduit 32 connects the second proportioning valve to the conduit 28 through which solution is delivered to the heating coil of the second heat-exchanger 25. The outlet of this heating coil is connected by a conduit 33 to a header 34 through which the sprays of the spray head 11 are supplied. Thus solution may be pumped from the sump 10 at the base of the second regeneration tower and may be delivered through the conduits 30 and 32, in admixture with solution coming from the first circulation system through the conduit 28, to the second heat-exchanger 25. From this heat-exchanger, the solution passes through the conduit 33 to the spray head 11, whence it is sprayed downwardly through the rising current of air induced in the second regeneration tower by the blower 5, back to the sump 10.

A conduit 35 connects the second proportioning valve 31 to the boiler 3 so that a fraction of the solution withdrawn from the sump 10 of the second regeneration tower may be fed continuously into the boiler. The boiler 3 is fuel-fired, so that steam is evaporated from the solution delivered thereto. The steam from the boiler passes through a steam off-take conduit 36 connecting the boiler to the second main heat-exchanger 25, through which it flows in contact with the heating coil therein and serves to heat solution passing through the second circulation system associated with the second regeneration tower. Condensate is withdrawn from the second heat-exchanger through a conduit 37, in which a steam trap may be included.

A conduit 38 connects the boiler 3 to the third heat-exchanger 27, so that hot concentrated solution withdrawn from the boiler may be passed in contact with the heating coil in the heat-exchanger 27, thereby heating solution being delivered from the first circulation system to the second heat-exchanger 25 in the second circulation system. The concentrated solution is withdrawn from the third heat-exchanger 27 through a conduit 39 to the place at which it is used.

To insure maximum heat economy in utilization of the apparatus, the air-discharge end of the first regeneration tower 1 comprises a heat-exchanger 40. To this end, a conduit 41 through which air is discharged from the first regeneration tower passes through a jacket 42. The base of the jacket is connected by a conduit 43 to the intake of the blower 4. Thus air delivered by the blower 4 to the first regeneration tower is first drawn through the jacket 42 in heat-exchange relation with air leaving the first regeneration tower through the air-discharge conduit 41. A hood 44 may be provided to form a roof overlying but spaced from the upper end of the jacket 42 through which air enters the system. Similarly, the air-discharge end of the second regeneration tower may comprise a heat-exchanger 45, made up of a jacket 46 surrounding a conduit 47 through which air leaving the second regeneration tower passes to the atmosphere. The base of the jacket 46 is connected by a conduit 48 to the intake of the blower 5, so that air delivered thereby to the second regeneration tower first passes in heat-exchange relation with air leaving the second regeneration tower through the conduit 47. A hood 49 may be provided to protect the open upper end of the jacket 46 through which the air enters.

Shallow sumps 50 and 51 may be provided at the bottoms of the heat-exchangers 40 and 45, respectively, to collect moisture condensed from the humid air leaving the first and second regeneration towers, respectively, in the course of passing through the said heat-exchangers. U-tube traps 52 and 53 serve to permit withdrawal of condensate from the sumps 50 and 51, respectively, without permitting the sumps to be opened to the atmosphere.

The apparatus described above is shown in association with air-cooling apparatus of the general character described in my copending applications Serial Nos. 527,125 and 651,991, to illustrate a particularly advantageous embodiment of the invention. The air-cooling apparatus is shown schematically in the lower right-hand corner of the drawing as it might be installed for cooling the warm and humid atmosphere of an underground mine.

The air-cooling apparatus comprises a fan 54 for blowing the mine air into and through a mine air cooler 55. The mine air cooler includes means for dehumidifying the air by bringing it into contact with a hygroscopic solution. A solution cooler 56 advantageously located near the mine air cooler 55 is provided for maintaining the temperature of the hygroscopic solution within proper limits for effective dehydration of the air. The hygroscopic solution from the air cooler circulates through a pipe 57 to and through the solution cooler, and is returned by a pump 58 through suitable piping to the mine air cooler. In the solution cooler the hygroscopic solution circulates in heat-exchange contact with cooling water (sometimes referred to as coolant) brought through piping 59 from a cooling tower 60, advantageously located at the surface of the ground, and spent cooling water is returned to the ground level, to be recooled for reuse, by means of a pump 61 and piping 62.

Diluted hygroscopic solution is continuously removed from the solution cooler 56 and is delivered by a pump 63 through the piping 12 to the sump 8 of the first regeneration tower described above, for the purpose of concentrating it. The concentrated or regenerated solution returns to the solution cooler 56 through the piping 39.

The above-described mine air-cooling apparatus is essentially that described in my copending application, Serial No. 527,125, now Patent No. 2,479,403. If it is desired to effect a substantial decrease in the dry bub temperature of the mine air in the manner described in my copending application Serial No. 651,991, now Patent No. 2,525,045, water for humidification of the air prior to each of several passes thereof in contact with the hygroscopic solution may be circulated through the mine air cooler by means of piping 64.

The cooling tower 60 for cooling the water coolant used in the solution cooler 56 constitutes a part of the mine air-cooling apparatus. Spent cooling water from the underground solution cooler is delivered to the cooling tower through piping 65 and is sprayed by a spray head 66 downwardly through the cooling tower to a reservoir or sump 67 at the tower base. Cooled water is returned to the solution cooler through the piping 59 from the reservoir 67. To effect maximum cooling of the water, a pump 68 continuously circulates water from the reservoir 67 through an air pre-cooler 69 and piping 70 to a second spray head 71 at the top of the cooling tower 60, whence the water is sprayed downwardly through the tower back to the reservoir. Atmospheric air is blown by a fan or blower 72 over the pre-cooler coils and upwardly through the tower in counter-current contact with the sprays of water, thereby cooling the water as it is sprayed downwardly through the tower. The air emerges from the top of the tower to the atmosphere through openings 73. The cooling tower 60 and the associated piping and equipment for circulating the water coolant therethrough is not a part of the present invention. It is shown and described herein in substantially the same form as previously described and shown in the drawings of both of my aforementioned copending applications.

The method of the invention is carried out in the apparatus described above substantially as follows: Diluted hygroscopic solution withdrawn from the underground solution cooler through the piping 12 enters the sump 8 at the base of the first regeneration tower, where it mixes with solution already therein that has previously been sprayed through the tower and has been thereby partially concentrated and appreciably cooled by evaporation of water into the current of air blown upwardly through the tower. Solution is continuously withdrawn from the sump 8 at the base of the first regeneration tower, and is pumped through the heating coil within the first heat-exchanger 13. At the same time, spent cooling water from the underground solution cooler is pumped through the piping 62 into the heat-exchanger 13, where it is brought in heat-exchange relation with the solution passing through the heating coils therein. The spent coolant entering the heat-exchanger 13 is still substantially at the maximum temperature to which it has been heated by its passage in contact with hygroscopic solution in the underground solution cooler 56. (In actual practice, its temperature may be 100° F. or thereabouts.) The hygroscopic solution entering the heat-exchanger 13, on the other hand, is at an appreciably lower temperature, because, for the most part, it consists of solution that has been previously circulated one or more times through the first regeneration tower and has been cooled by evaporation of excess water. Hence the spent coolant may be partially cooled, and the solution may be heated, by transfer of heat from the spent cooling water to the solution in the heat-exchanger 13. In this manner a considerable part of the heat absorbed by the coolant in the course of cooling the mine air is effectively utilized to provide the heat necessary to evaporate excess water from the hygroscopic solution and so concentrate it for reuse. The spent cooling water passes from the first heat-exchanger 13 through the piping 65 to the cooling tower 60, wherein it is further cooled prior to being returned to the underground solution cooler.

The now somewhat heated hygroscopic solution passes from the first heat-exchanger 13 to the proportioning valve 16, which is set to direct a major part of the solution through the conduit 18 to the spray head 9 at the top of the first regeneration tower, whereby it is sprayed downwardly through the upward current of air delivered by the fan or blower 4. In falling through the tower, some of the excess water in the solution evaporates into the rising current of air. The heat of vaporization of the excess water thus evaporated comes mostly from the solution itself, thereby lowering its temperature. At the same time, the air itself is somewhat heated by its passage in contact with the solution, for the solution, as it emerges from the spray head, is at a higher temperature than the incoming air. The net result of the countercurrent contact between the downward spray of heated hygroscopic solution and upward current of air is to evaporate some water from the solution and lower its temperature, while, at the same time, increasing the moisture vapor content of the air and raising its temperature. Thus, as described above, the hygroscopic solution collecting in the sump 8, and with which the diluted hygroscopic solution from the underground solution cooler is mixed, is at a low enough temperature to absorb heat in the heat-exchanger 13 from spent cooling water delivered thereto from the underground solution cooler.

The air leaving the first regeneration tower through the conduit 41 is at an appreciably higher temperature than the outdoor air, in consequence of its passage in contact with the heated solution delivered to the spray head 9, and a substantial part of its heat content may be transferred in the heat-exchanger 40 to fresh incoming air inducted by the blower 4 and delivered thereby to the first regeneration tower. The preheating of the incoming air that takes place in the heat-exchanger 40 lowers its relative humidity and so facilitates evaporation of water from the spray of solution. The preheating of the incoming air in the heat-exchanger 40 is, of course, accompanied by a decrease in the temperature of the air leaving the first regeneration tower through the conduit 41, and in consequence a part of the moisture in the humid exiting air condenses. The sump 50 and trap 52 provide for withdrawing this condensed moisture before it is enabled to flow back into the regeneration tower and redilute the partially concentrated hygroscopic solution collecting in the sump 8.

The minor proportion of partially concentrated hygroscopic solution diverted by the proportioning valve 16 from recirculation through the first regeneration tower passes through the piping 26 and to and through the third heat-exchanger 27, thence through the conduit 28 to and through the second heat-exchanger 25, and therefrom through the conduit 33 to the spray head 11 near the top of the second regeneration tower. It is sprayed thereby downwardly through the upward current of air induced by the fan 5 in this tower to the sump 10 at the base of the tower.

In consequence of its passage through the second and third heat-exchangers 25 and 27, the partially concentrated hygroscopic solution delivered to the spray head 11 is at a higher temperature than when it was first diverted from the circulation system associated with the first regeneration tower. In general its temperature will be substantially above 150° F. as it is sprayed from the spray head 11. Consequently, a substantial further part of the excess moisture which it contains is evaporated into the current of air rising through the second regeneration tower. This, of course, results in further concentration of the solution that collects in the sump 10.

To insure achieving the maximum further concentration that may be attained in the second regeneration tower, solution is continuously pumped from the sump at the base of this tower through the conduit 30 to the second proportioning valve 31, which is set to direct a major portion of this solution through the conduit 32 to the second heat-exchanger 25. Solution recirculating through the conduit 32 and solution withdrawn from the circulation system associated with the first regeneration tower, flowing through the conduit 28, mix with one another just before entering the second heat-exchanger 25.

As in the case of the first regeneration tower, solution sprayed downwardly through the second regeneration tower becomes cooled by evaporation of excess water, and at its resulting lowered temperature may be reheated by passage through the heat-exchanger 25 preparatory to being again sprayed downwardly through the second regeneration tower.

Also, as in the case of the first regeneration tower, the air passing upwardly through the second regeneration tower picks up a substantial amount of water vapor and becomes heated by its contact with the warm hygroscopic solutions sprayed into the tower. The air passing from the second regeneration tower generally is at a temperature in the neighborhood of 150° F., a temperature appreciably higher than that of the solution as it leaves the first heat-exchanger 13 to be circulated through the first regeneration tower. A substantial heat economy therefore may be achieved by passing the air as it leaves the second regeneration tower over the heating coils of the heat-exchanger 20, and by passing hygroscopic solution flowing to the spray head 9 of the first regeneration tower through this heat-exchanger, by means of conduits 21 and 22. The valves 23 and 24 may be regulated to proportion the relative amount of solution that flows through the heat-exchanger 20 and the relative amount of such solution that is passed directly to the spray head 9 from the first heat-exchanger 13. Under some conditions, it may be desirable to direct all of the solution passing through the circulation system associated with the first regeneration tower through the heat-exchanger 20, and conditions may also arise when little or no advantage is derived from passing any of the solution in the first circulation system through the heat-exchanger 20. In many cases optimum operation is achieved when a considerable part of the solution circulating in the first circulation system passes through the heat-exchanger 20, and the remainder by-passes this heat-exchanger, flowing directly to the spray head 9 of the first regeneration tower.

The temperature of the air leaving the second regeneration tower is generally appreciably above atmospheric temperature, even when it has given up the maximum amount of heat possible to solution circulating through the heat-exchanger 20. Efficient evaporation of water from solution in the second regeneration tower therefore may be promoted by passing the air leaving this tower through the conduit 47 in heat-exchange relation, in the heat-exchanger 45, with air inducted from the atmosphere by the blower 5, prior to being blown into the second regeneration tower. The relative humidity of the incoming air is reduced in the heat-exchanger 45, so that it may more readily absorb water vapor from solution being sprayed into the second regeneration tower. Moisture condensed from the humid air leaving the second regeneration tower through the heat-exchanger 45 is withdrawn from the sump 51 through the trap 53 before the condensate has a chance to flow back into the tower and redilute the hygroscopic solution therein. The same sump and trap may also serve for collecting and withdrawing any moisture condensed in the heat-exchanger 20.

Final concentration of the hygroscopic solution is effected in the fuel-fired or otherwise heated boiler 3, to which the minor proportion of hygroscopic solution, pumped from the sump 10 at the base of the second regeneration tower and diverted from recirculation through this tower by the proportioning valve 31, is delivered through the conduit 35. The solution in the boiler is advantageously heated about to the boiling temperature of water, under about atmospheric pressure, thereby forcing evaporation of the residual excess water and concentrating the solution sufficiently for reuse in the underground mine air cooler. The steam evaporated from the solution in the boiler serves as the heating medium by which solution circulating in the circulation system associated with the second regeneration tower is heated in the second heat-exchanger 25. The condensed steam is withdrawn from the second heat-exchanger through a conduit 37 and steam trap to waste, or to any desired point of use.

The concentrated hygroscopic solution withdrawn from the boiler through the conduit 38 is at too high a temperature to be used efficiently in the underground mine air cooler 55, and it is desirable to recover heat from it to promote concentration of a further quantity of the hygroscopic solution. Accordingly, the hot concentrated solution from the boiler is passed to the third main heat-exchanger 27, where it serves to preheat partially concentrated solution withdrawn from the circulation system associated with the first regeneration tower and being passed to the second regeneration tower. The temperature of the concentrated hygroscopic solution may be reduced in the third heat-exchanger 27 to near that of the spent cooling water which serves as the heating medium for the first heat-exchanger 13. As this is about the lowest temperature to which it may be cooled efficiently in the solution-concentrating system, the concentrated soltuion advantageously is delivered directly from the third heat-exchanger 27 through the piping 39 to the underground solution cooler for reuse in the air-cooling system. It may be cooled in the solution cooler to the temperature desired for use in the mine air cooler. The heat absorbed from it by the cooling water in the solution cooler is, in part, recovered when the spent coolant is delivered to the first heat-exchanger 13.

The apparatus and method of the invention have been found to be effective for regenerating quite dilute hygroscopic solution to the degree of concentration necessary for optimum use in an air cooling and dehumidifying system. The method and apparatus of the invention effect this degree of concentration with a minimum of expense for heat and power. Apart from the utilization of spent cooling water to supply heat to solution circulating through the first heat-exchanger 13, the only heat supplied to the solution-concentration system from an external source is that used for heating the solution in the boiler. Effective recovery of heat at substantially every point in the concentrating system from which heated air or solution leaves the system, and utilization of the heat so recovered to aid in evaporating excess moisture from the solution, results in a minimum expenditure for boiler fuel. Utilization of the spent cooling water from the underground solution cooler for providing a part of the heat required to evaporate moisture from the diluted hygroscopic solution, in combination with the effective heat recovery provisions, can in a well-operated concentration plant, constructed and operated in accordance with the invention, result in a fuel consumption so low as to be actually less than the amount theoretically necessary for supplying the heat of vaporization of the water evaporated from the solution.

The apparatus provided by the invention is simple, efficient, easily maintained, and requires only a rather small amount of power for operation of blowers, pumps, etc. The regeneration towers may be quite compact, as the physical reaction by which the vapor pressure of the solution and the air become equalized in the regeneration towers is a rapid one. The effective height of the regeneration towers, between the point of air introduction and the spray head, may be no more than three or four feet. The boiler and heat-exchangers likewise may be compactly designed, so that the entire assembly of concentrating apparatus may be accommodated within a limited amount of space.

While the method and apparatus of the invention have been particularly designed for use in concentrating hygroscopic solution used in mine air-cooling systems of the character described in my copending applications Serial Nos. 527,125 and 651,991, now Patent Nos. 2,479,408, and 2,525,045, respectively, it is evident that the invention is not limited to use in conjunction with these particular systems. On the contrary, the invention may be employed with advantage in any establishment confronted with the problem of efficiently and economically concentrating hygroscopic or like solutions, especially where a continuous concentrating system is desired.

I claim:

1. The method of concentrating diluted hygroscopic solution which comprises repeatedly circulating diluted hygroscopic solution in a first regenerating circuit in heat-exchange relation with a heating medium and thence in contact with a current of air having a vapor pressure less than that of the solution with which it is in contact, withdrawing partially concentrated solution from said first circuit and repeatedly circulating it in a second regenerating circuit in heat-exchange relation with a second heating medium having a higher temperature than said first-mentioned heating medium and thence in contact with a second current of air having a vapor pressure less than that of the solution with which it is in contact, and withdrawing further concentrated hygroscopic solution from said second regenerating circuit.

2. The method of concentrating diluted hygroscopic solution which comprises repeatedly circulating diluted hygroscopic solution in a first regenerating circuit in heat-exchange relation with a heating medium and thence in contact with a current of air having a vapor pressure less than that of the solution with which it is in contact, withdrawing partially concentrated solution from said first circuit and repeatedly circulating it in a second regenerating circuit in heat-exchange relation with a second heating medium having a higher temperature than said first-mentioned heating medium and thence in contact with a second current of air having a vapor pressure less than that of the solution with which it is in contact, withdrawing further concentrated hygroscopic solution from said second regenerating circuit and heating it to a temperature approximating the boiling temperature of water, and withdrawing concentrated hygroscopic solution from said boiling operation.

3. The method according to claim 1, characterized in that the partially concentrated solution withdrawn from the first regenerating circuit is heated prior to introduction into the second regenerating circuit by passing it in heat-exchange relation with warm finally concentrated solution.

4. The method according to claim 1, characterized in that the air with which the solution is passed in contact in each regenerating circuit is preheated as it enters each circuit respectively by passing it in heat-exchange relation with warm air leaving such circuit.

5. The method according to claim 1, characterized in that at least a portion of the solution circulating in the first regenerating circuit is heated by passing it in heat-exchange relation with air leaving the second regenerating circuit.

6. The method according to claim 2, characterized in that the solution circulating in the second regenerating circuit is heated by passing it in heat-exchange relation with steam vaporized from the solution in the boiling operation.

7. The method according to claim 2, characterized in that the partially concentrated solution withdrawn from the first regenerating circuit is heated prior to introduction into the second regenerating circuit by passing it in heat-exchange relation with hot concentrated solution withdrawn from the boiling operation.

8. The method according to claim 2, characterized in that the partially concentrated solution withdrawn from the first regenerating circuit is heated prior to introduction into the second regenerating circuit by passing it first in heat-exchange relation with concentrated solution withdrawn from boiling operation and then in heat-exchange relation with steam from boiling operation.

9. In a process wherein a hygroscopic solution absorbs moisture, becoming heated and diluted, and wherein the thus heated hygroscopic solution is cooled by being passed in heat-exchange relation with a coolant, resulting in heating of the coolant, the method of concentrating the diluted hygroscopic solution which comprises passing diluted solution in contact with a current of air having a vapor pressure less than that of the solution, whereby water is evaporated from the solution and the solution is cooled, then heating the solution by passing it in heat-exchange relation with heated coolant previously used to cool the hygroscopic solution, and recirculating at least a part of the solution again in contact with said current of air.

10. In a process wherein a hygroscopic solution absorbs moisture, becoming heated and diluted, and wherein the thus heated hygroscopic solution is cooled by being passed in heat-exchange relation with a coolant, resulting in heating of the coolant, the improvement which comprises concentrating the diluted hygroscopic solution by evaporation of excess moisture therefrom, and utilizing the heated coolant to supply a part of the heat required to effect such evaporation of excess moisture from the solution.

11. Apparatus for concentrating hygroscopic solution comprising first and second regeneration towers each having a sump at the base thereof and a spray head near the top thereof, a heat-exchanger associated with each regeneration tower, blower means connected to the lower portion of each tower above the sump for inducing an upward current of air through each tower and out through an air discharge conduit at the top thereof, a conduit connected to each heat-exchanger for supplying heating medium thereto, a conduit for delivering dilute hygroscopic solution to the first regeneration tower, a first circulation conduit connecting the sump of the first tower with the spray head thereof for circulating such solution from the sump of said first tower through the associated heat-exchanger to the spray head of said tower and downwardly as a spray through the upward current of air therein back to the sump, a second circulation conduit connecting the sump of the second tower with the spray head thereof for similarly circulating hygroscopic solution through the second regeneration tower and the heat-exchanger associated therewith, a conduit connecting the first and second circulation conduits for delivering partially concentrated hygroscopic solution from said first circulation system to said second circulation system, a conduit for withdrawing further concentrated solution from said second circulation conduit, an air heat-exchanger associated with at least one of said towers through which the air discharge conduit thereof passes, and an air inlet conduit connected to the inlet of the blower means for said tower and also passing through said air heat-exchanger, whereby air delivered to said tower is first passed through said air heat-exchanger in heat-exchange relation with air leaving said tower.

12. Apparatus for concentrating hygroscopic solution comprising first and second regeneration towers each having a sump at the base thereof and a spray head near the top thereof, blower means connected to the lower portion of each tower above the sump for inducing an upward current of air through each regeneration tower, first and second heat-exchangers associated with the first and second regeneration towers respectively, a conduit connected to the first heat-exchanger for supplying heating medium thereto, a boiler and means for heating hygroscopic solution in said boiler, a conduit for delivering dilute hygroscopic solution to the first regeneration tower, a first circulation conduit connecting the sump of the first tower with the spray head thereof for circulating such solution from the sump of said first tower through the first heat-exchanger to the spray head of said tower and downwardly as a spray through the upward current of air therein back to the sump, a second circulation conduit connecting the sump of the second tower with the spray head thereof for similarly circulating hygroscopic solution through the second generation tower and the second heat-exchanger associated therewith, a conduit connecting the first and second circulation conduits for delivering partially concentrated hygroscopic solution from said first circulation conduit to said second circulation conduit, a conduit connecting the second circulation conduit with the boiler for delivering further concentrated solution from said second circulation conduit to the boiler, and a conduit connecting the boiler to the second heat-exchanger for passing steam from said boiler to said second heat-exchanger and thereby into heat-exchange relation with the solution being circulated therethrough.

13. Apparatus according to claim 12, characterized in that a third heat-exchanger is included in the conduit connecting the first and second circulation systems through which partially concentrated solution is delivered from the first circulation system to the second circulation system, and a conduit connecting the boiler to said third heat-exchanger for passing hot concentrated hygroscopic solution to said third heat-exchanger and thereby into heat-exchange relation with the partially concentrated solution passing therethrough.

14. In apparatus of the character described, comprising first and second regeneration towers, blower means connected to each tower near the base thereof for inducing an upward current of air through each tower, conduits for delivering hygroscopic solution to the top of each tower, and heating means for heating the hygroscopic solution delivered to the top of the second tower to a higher temperature than the solution delivered to the top of the first tower, the improvement which comprises a heat-exchanger positioned in the path of air leaving the second regeneration tower, said heat-exchanger being included in the conduit for delivering hygroscopic solution to the top of the first regeneration tower, whereby said solution is passed in heat-exchange relation with air leaving the second tower just before delivery of said solution to the top of the first regeneration tower.

15. The combination with apparatus comprising a device in which hygroscopic solution becomes diluted and heated and a solution cooler in which the heated hygroscopic solution is brought into heat-exchange relation with a coolant (resulting in heating of the coolant), of means for concentrating the hygroscopic solution comprising a regeneration tower, a conduit for delivering dilute hygroscopic solution into contact with air in said regeneration tower, whereby water is evaporated from the solution and the solution is cooled, a heat-exchanger, a conduit connecting the solution cooler and the heat-exchanger for delivering heated coolant to said heat-exchanger, and a conduit connecting the regeneration tower to the heat-exchanger for delivering cooled solution from the tower to the heat-exchanger and thereby into heat-exchange relation with said heated coolant.

16. The combination with apparatus comprising a device in which hygroscopic solution becomes diluted and heated and a solution cooler in which the heated hygroscopic liquid is brought into heat-exchange relation with a coolant (resulting in heating of the coolant), of means for concentrating the hygroscopic solution comprising a regeneration tower having a sump at its base and a spray head near its top, blower means connected to said tower near the base thereof for inducing an upward current of air through said tower, a first conduit for delivering dilute hygroscopic solution to the tower sump, a second conduit connecting the tower sump to the spray head through which solution in the sump may be passed to the tower spray head and may thence be sprayed downwardly through the current of air in the tower to the sump (whereby water is evaporated from the solution with consequent cooling thereof), a heat-exchanger included in said second conduit, a third conduit connecting the solution cooler and the heat-exchanger through which heated coolant may be delivered to the heat-exchanger and thereby into heat-exchange relation with the solution passing therethrough, whereby solution cooled in falling through the tower to the sump may be heated in passing back to the spray head, and a solution-withdrawal conduit connected to said tower for withdrawing solution concentrated therein.

ALLAN S. RICHARDSON.

REFERENCES CITED

The following references are of record in the file of this patent:

UNITED STATES PATENTS

| Number | Name | Date |
|---|---|---|
| 1,190,317 | Naudet | July 11, 1916 |
| 2,092,470 | Peebles | Sept. 7, 1937 |
| 2,280,633 | Crawford | Apr. 21, 1942 |
| 2,290,465 | Crawford | July 21, 1942 |
| 2,367,695 | Spiselman | Jan. 23, 1945 |